United States Patent
Cabrera

Patent Number: 5,844,164
Date of Patent: Dec. 1, 1998

[54] GAS GENERATING DEVICE WITH SPECIFIC COMPOSITION

[75] Inventor: Raul Rosales Cabrera, Tampa, Fla.

[73] Assignee: Breed Automotive Technologies, Inc., Lakeland, Fla.

[21] Appl. No.: 606,317

[22] Filed: Feb. 23, 1996

[51] Int. Cl.[6] .............................. C06D 5/06; C06B 47/08; C06B 29/02

[52] U.S. Cl. ........................ 102/288; 102/289; 149/36; 149/61; 149/77

[58] Field of Search .................................. 102/288, 289, 102/290; 149/36, 37, 61, 77

[56] References Cited

U.S. PATENT DOCUMENTS

| | | | |
|---|---|---|---|
| 1,511,771 | 10/1924 | Rathsburg | 149/108.6 |
| 3,055,911 | 9/1962 | Finnegan et al. | 548/250 |
| 3,171,249 | 3/1965 | Bell | 60/215 |
| 3,348,985 | 10/1967 | Stadler et al. | 149/2 |
| 3,468,730 | 9/1969 | Gawlick et al. | 149/61 |
| 3,719,604 | 3/1973 | Prior | 252/186.33 |
| 3,734,789 | 5/1973 | Moy et al. | 149/19.4 |
| 3,739,574 | 6/1973 | Godfrey | 60/39.06 |
| 3,897,285 | 7/1975 | Hamilton et al. | 149/41 |
| 3,898,112 | 8/1975 | Strecker et al. | 149/19.9 |
| 3,909,322 | 9/1975 | Chang et al. | 149/19.4 |
| 3,912,561 | 10/1975 | Doin et al. | 149/35 |
| 3,954,528 | 5/1976 | Chang et al. | 149/19.4 |
| 4,013,010 | 3/1977 | Schneiter et al. | 102/531 |
| 4,178,017 | 12/1979 | Ishi et al. | 280/740 |
| 4,369,079 | 1/1983 | Shaw | 149/2 |
| 4,370,181 | 1/1983 | Lundstrom et al. | 149/2 |
| 4,796,912 | 1/1989 | Lauritzen et al. | 280/736 |
| 4,931,112 | 6/1990 | Wardle et al. | 149/88 |
| 4,948,439 | 8/1990 | Poole et al. | 149/46 |
| 4,989,895 | 2/1991 | Pearson et al. | 280/731 |

(List continued on next page.)

OTHER PUBLICATIONS

Kaye, Encyclopedia of Explosives and Related items, Patr 2700, vol. 9, US Army Armament and Development Command, (1980), pp. T111–T140.

Primary Examiner—Peter A. Nelson

[57] ABSTRACT

A gas generating device has a housing in combination with a device for igniting a gas generating composition located within the housing. The gas generating composition is 5-aminotetrazole combined with at least two inorganic oxidizers selected from potassium nitrate, potassium perchlorate, manganese dioxide, iron oxide, and copper oxide. The housing has at least one aperture therethrough to allow the exit from the housing of gas generated therein following ignition of the gas generating composition, but restricting the flow of gas from the housing such that the gas exiting the housing has a carbon monoxide content of not greater than 200 parts per million. Such a gas generating device may be used for inflating an airbag in a vehicle safety system.

8 Claims, 15 Drawing Sheets

U.S. PATENT DOCUMENTS

| | | | |
|---|---|---|---|
| 4,998,750 | 3/1991 | Werner et al. | 280/740 |
| 5,003,887 | 4/1991 | Unterforsthuber et al. | 102/531 |
| 5,009,855 | 4/1991 | Nillsson | 422/164 |
| 5,018,761 | 5/1991 | Henseler | 28/730.1 |
| 5,022,674 | 6/1991 | Frantom et al. | 280/741 |
| 5,028,070 | 7/1991 | Bender | 280/741 |
| 5,035,757 | 7/1991 | Poole | 149/46 |
| 5,053,086 | 10/1991 | Henry et al. | 149/19.4 |
| 5,054,811 | 10/1991 | Unterforsthuber et al. | 280/742 |
| 5,139,588 | 8/1992 | Poole | 149/61 |
| 5,149,129 | 9/1992 | Unterforsthuber et al. | 280/740 |
| 5,160,163 | 11/1992 | Castagner et al. | 280/740 |
| 5,197,758 | 3/1993 | Lund et al. | 280/741 |
| 5,198,046 | 3/1993 | Bucerius et al. | 149/61 |
| 5,215,721 | 6/1993 | Tasaki et al. | 422/165 |
| 5,260,038 | 11/1993 | Decker et al. | 422/305 |
| 5,294,414 | 3/1994 | Brede et al. | 422/305 |
| 5,306,041 | 4/1994 | Ogawa et al. | 280/741 |
| 5,306,883 | 4/1994 | Manandhar et al. | 200/61.53 |
| 5,322,325 | 6/1994 | Breed et al. | 280/735 |
| 5,340,150 | 8/1994 | Harada et al. | 280/740 |
| 5,344,186 | 9/1994 | Bergerson et al. | 280/741 |
| 5,345,876 | 9/1994 | Rose et al. | 102/531 |
| 5,351,988 | 10/1994 | Bishop et al. | 280/737 |
| 5,351,989 | 10/1994 | Popek et al. | 280/737 |
| 5,372,380 | 12/1994 | Duffy et al. | 280/740 |
| 5,386,775 | 2/1995 | Poole et al. | 102/209 |
| 5,388,859 | 2/1995 | Fischer et al. | 280/737 |
| 5,390,954 | 2/1995 | Faigle et al. | 280/736 |
| 5,397,543 | 3/1995 | Anderson | 422/165 |
| 5,424,449 | 6/1995 | Rothgery et al. | 548/251 |
| 5,431,103 | 7/1995 | Hock et al. | 102/287 |
| 5,437,472 | 8/1995 | Kuretake et al. | 280/737 |
| 5,439,251 | 8/1995 | Onishi et al. | 280/741 |
| 5,441,705 | 8/1995 | Lauritzen et al. | 422/166 |
| 5,447,105 | 9/1995 | Bauer et al. | 102/530 |
| 5,451,682 | 9/1995 | Highsmith et al. | 548/251 |
| 5,460,668 | 10/1995 | Lyon | 149/36 |
| 5,467,715 | 11/1995 | Taylor et al. | 102/289 |
| 5,472,534 | 12/1995 | Wardle et al. | 149/36 |
| 5,482,579 | 1/1996 | Ochi et al. | 149/83 |
| 5,500,059 | 3/1996 | Lund | 149/19.1 |
| 5,516,377 | 5/1996 | Highsmith et al. | 149/18 |
| 5,551,725 | 9/1996 | Ludwig | 280/737 |

GAS GENERATING DEVICE WITH SPECIFIC COMPOSITION

FIELD OF THE INVENTION

The present invention relates to a device which generates combustion gases which can be used, for example, in the inflation of an airbag designed to protect an occupant of a vehicle, such as an automobile, in the event of a crash.

BACKGROUND OF THE INVENTION

Airbag systems have been developed to protect a vehicle occupant in the event of a crash by rapidly deploying a gas inflated bag between a vehicle occupant and the interior of the vehicle. A typical airbag system comprises a crash sensor, a gas generating device and a non-inflated bag connected to the outlet of the gas generating device.

A gas generating device typically comprises a metal housing which contains: (a) an igniter which is either a squib or a stab primer, (b) a booster composition, (c) a gas generating composition, and (d) a gas filtering system. When a sensor senses a crash of a selected severity it activates the igniter which in turn sets off the booster composition in the explosive train. The booster composition sets off the gas generating composition, sometimes referred to in the art as a propellant. The gas generated by the gas generating composition passes through appropriate filters and then through one or more portals in the housing into an airbag. Thus the igniter, the booster and the gas generating composition form the explosive train and the gas generated from this system during a vehicle crash fills a bag that forms a safety barrier between a vehicle occupant and the interior of the vehicle.

The requirements for a gas generating composition suitable for use in a vehicle airbag system are very demanding. The gas generating composition must burn very rapidly to inflate the airbag, for example in 30 milliseconds or less, but the burn rate must be controllable and reproducible to ensure airbag deployment and inflation in the required time, location and configuration. The gas generating composition must be extremely reliable for an extended period of time, preferably at least ten years. Ignition must be certain, and the burn rate of the gas generating composition must remain constant despite extensive exposure of the composition to vibration and a wide range of temperatures. The gas generating composition is protected from moisture when sealed in the gas generating housing, but should still be relatively insensitive to moisture to minimize problems during manufacture and storage of the gas generating composition and assembly of the gas generating device, and to ensure reliability during the life of the airbag system.

The most desirable gas inside an inflated airbag would be substantially equivalent in composition to air, but thus far this has not been attained. The next best solution is inflation of the airbag with a physiologically inert, or at least innocuous gas. Most of the development of gas generating compositions used for inflating airbags in vehicles has involved the use of metallic azides in combination with an oxidizer, where the gas generated to fill the airbag is nitrogen. Gas generating compositions comprising sodium azide in combination with a variety of oxidizers and other additives are well known. However, sodium azide is a very toxic material if improperly handled.

The gas generating device of the present invention preferably employs a gas generating composition which contains 5-aminotetrazole in combination with a mixture of oxidizing substances. When this gas generating composition is ignited under the conditions provided by the gas generating device disclosed herein the volume and quality of the resultant gas meets the rigid standards for use in inflating an airbag in a motor vehicle in the event of a crash.

BRIEF DESCRIPTION OF THE DRAWINGS

The features of the invention which are believed to be novel are set forth with particularity in the appended claims. The present invention, both as to its structure and manner of operation, may best be understood by referring to the following detailed description, taken in accordance with the accompanying drawings in which:

DETAILED DESCRIPTION OF THE INVENTION

Figure 1:
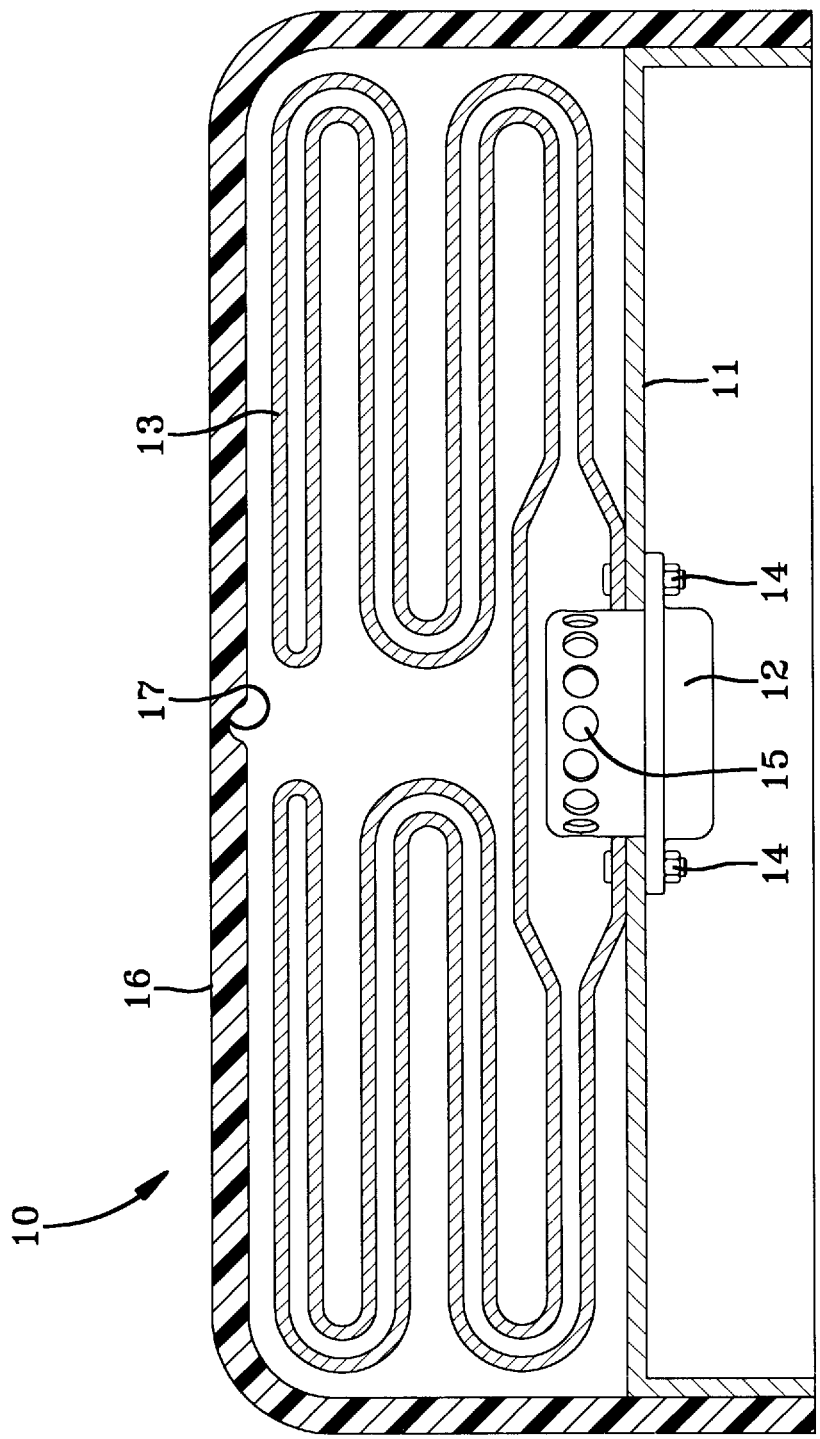
FIG. 1 is a diagrammatic side view, partially in section, of a prior art airbag system.
Figure 2:
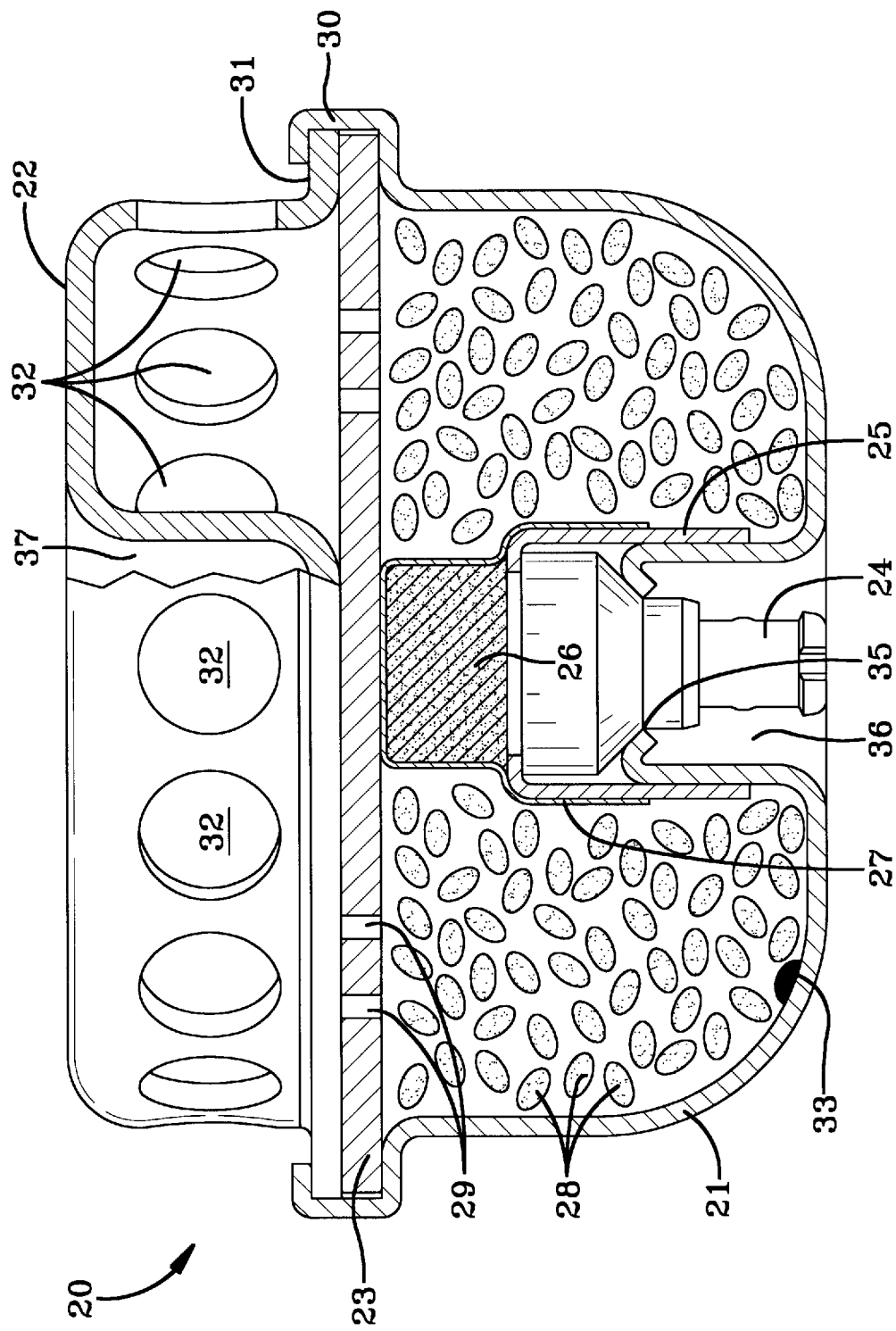
FIG. 2 is a side view, partially in section, of a gas generating device according to a first embodiment of the present invention.
Figure 3:
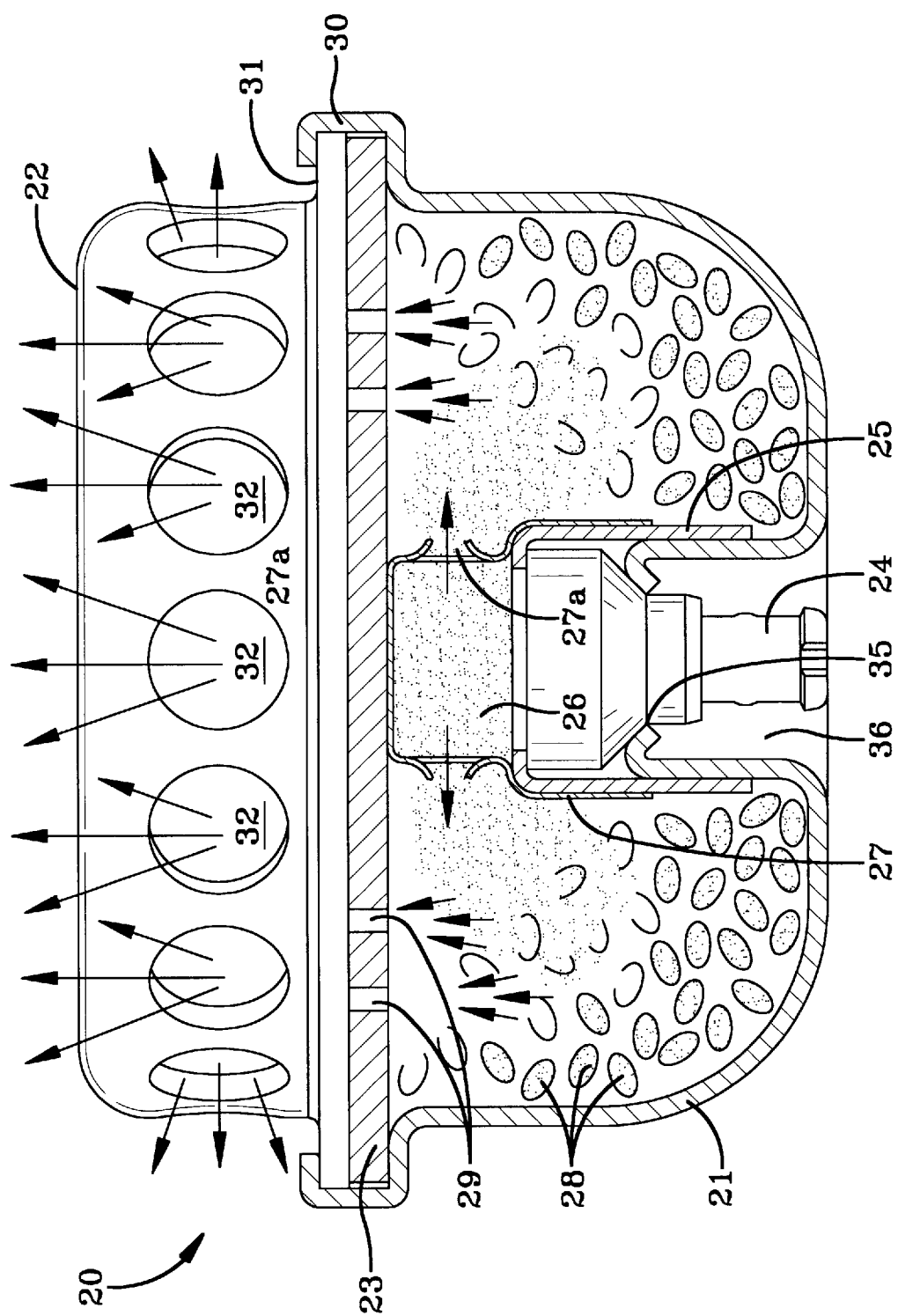
FIG. 3 is a side view, partially in section, of the gas generating device of FIG. 2 illustrating the operation of the device during the gas generation process.
Figure 4:
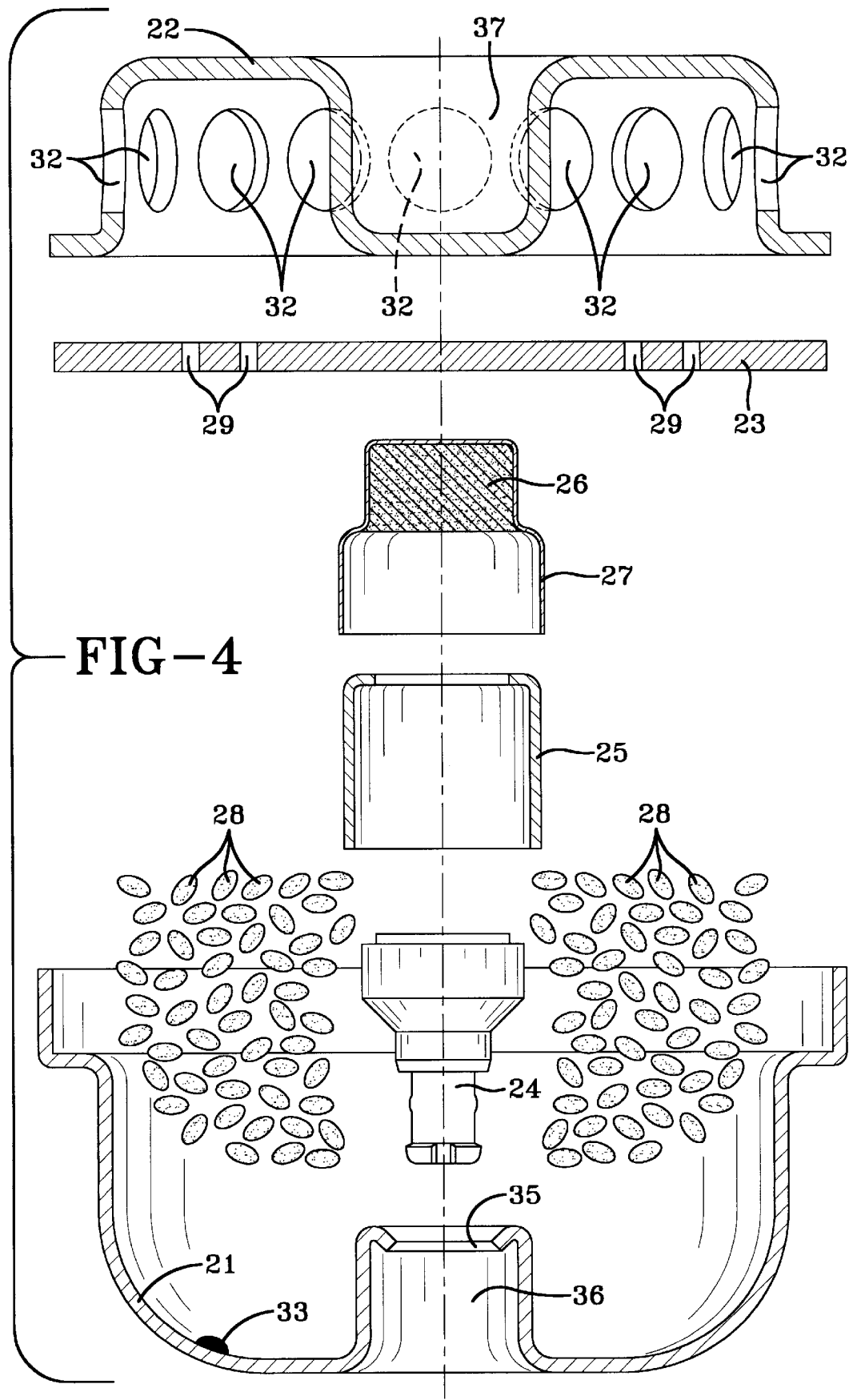
FIG. 4 is an exploded view, partially in section, of the gas generating device of FIG. 2.
Figure 5:
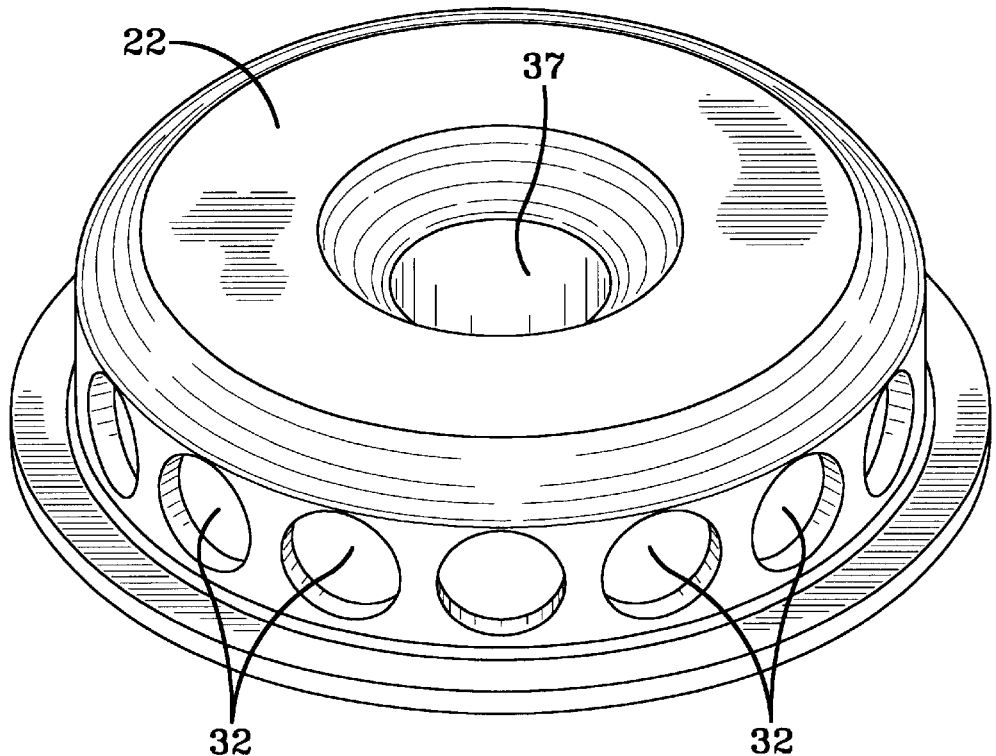
FIG. 5 is a perspective view of a housing member which is a component of the gas generating device of FIG. 2.
Figure 6:
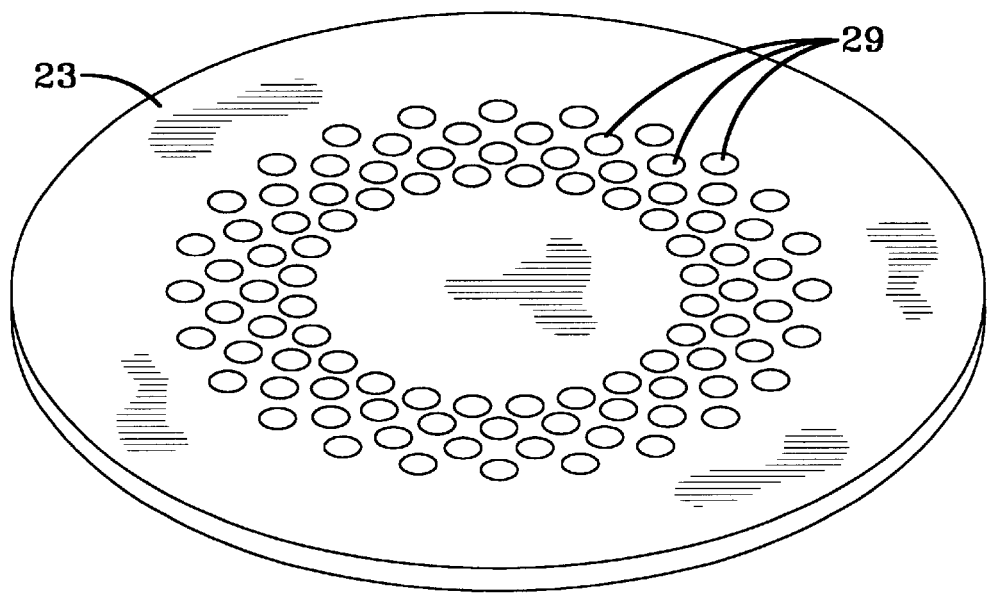
FIG. 6 is a perspective view of a choke plate which is a component of the gas generating device of FIG. 2.

Referring first to FIG. 1 there is shown a diagrammatic side view, partially in section, of a representative prior art vehicle airbag assembly 10. A mounting plate 11, which may be located in a steering wheel, instrument panel or other suitable location in the vehicle, has a typical gas generating device 12 and an airbag 13 attached thereto by a suitable means for attachment such as threaded fasteners 14. A cover 16 holds the folded airbag in place until such time as it is to be deployed. The cover 16 typically has a weakened portion 17 which facilitates the breakage of the cover in a desired manner when the airbag is inflated. The gas generating device 12 contains a composition which generates gas when burned, and the generated gas exits the gas generating device via holes 15 in the gas generating device to inflate the airbag 13. The gas generating device is activated by a signal from a crash sensor (not shown) when the crash sensor senses a crash of sufficient severity to require deployment of the airbag to reduce interaction of a vehicle occupant with the structure of the vehicle.

In the embodiments described below the airbag system employs at least one crash sensor (not shown) which may be a conventional sensor of any of the types which are well known in the crash sensing art, such as those taught in U.S. Pat. No. 5,322,325 and U.S. Pat. No. 5,306,883, which measure the rate of deceleration of the vehicle and produce an output signal, or close an electrical circuit, if the deceleration sensed indicates that a collision of a selected severity has occurred. The disclosures of U.S. Pat. No. 5,322,325 and U.S. Pat. No. 5,306,883 are incorporated herein by reference for the purpose of teaching crash sensors which may be employed in the practice of the present invention. The crash sensor(s) may be located in the front structure of the vehicle, in the steering wheel, in the dashboard, in the roof of the vehicle, or any other suitable location. In the preferred embodiment of the present invention the crash sensor acts by closing an electrical circuit or initiating a firing signal that initiates a series of events which result in an airbag being inflated by a gas generating device.

The gas generating composition employed in the gas generating device of the present invention contains 5-aminotetrazole and is the subject of commonly assigned U.S. application Ser. No. 08/606,319 filed Feb. 23, 1996.

5-aminotetrazole, hereinafter referred to as "5-AT" has a nitrogen content of 67.9%, and a melting point of 202° C. It is capable of forming salts with alkalay and alkaline earth metals. It is advantageous as a fuel for a non-azide gas generating composition, not only because of its high nitrogen content, but also the presence of only one carbon atom in the molecule which has to be taken to its highest oxidation state for giving a non toxic gas. The 5-AT is combined with at least two inorganic oxidizers selected from a the group consisting of potassium nitrate ($KNO_3$), potassium perchlorate ($KClO_4$), manganese dioxide ($MnO_2$), iron oxide ($Fe_2O_3$), and copper oxide (CuO). While an anhydrous variety of 5-aminotetrazole is preferred, a hydrated variety is also acceptable. An anhydrous variety of this compound is available which enhances its value for developing a non-azide gas generating composition, as the nitrogen content goes up to 82.3%, which makes it extremely attractive for the aforementioned objectives. The oxidizers combined with the 5-AT are all commonly available chemicals in a high degree of purity and with no water of crystallization in their molecules.

In accordance with the present invention the fuel and oxidizers are mixed in predetermined stoichio metric ratios. Standard mixing equipment for mixing energetic solids of the types well known to those who have the skill and knowledge of this art is used in the manufacture of the gas generating composition.

For the gas generating reaction to occur in the designed time frame, as required for the effective deployment of airbags in vehicles, it is necessary to comminute these materials to desired particle size. The particle sizes are determined using state of art equipment for measuring particle size distribution. The 50% point would be a good guidance for controlling the particle size. In the examples presented below, and the preferred method of manufacturing the gas generating compositions employed in the practice of the present invention, the particles sizes of the various components prior to combining them were as follows: 5-AT 12–32 microns; $KNO_3$ 20–30 microns; $KClO_4$ 20–30 microns; $MnO_2$ 2–5 microns; $Fe_2O_3$ 0.5–1.5 microns; and CuO 5–10 microns. As used herein and in the claims a micron is understood to be $10^{-4}$ centimeters.

In the examples presented below, and the preferred method of manufacturing the gas generating compositions used in the practice of the present invention, the composition is formed into units, such as tablets, having a density in the range of about 2.5–2.7 gm\cc. For instance in the following examples the gas generating compounds were formed into tablets weighing 60–70 mg with a diameter of about 5 mm and a thickness of about 2 mm. In the examples presented below, and the preferred method of manufacturing the gas generating compositions of the present invention, the tablets had a moisture content (water) of about 0.5–1.5%, by weight which is believed to be important if the gas generating composition is to be used for inflating a vehicle safety system airbag. In the examples presented below, and the preferred method of manufacturing the gas generating compositions of the present invention, the tablets contain as free flow agents, by weight, about 0.5% magnesium silicate and about 0.5% aluminum oxide, both of which are available from D'Gussa in Germany. It is believed that any suitable standard tableting equipment may be employed in practicing the invention.

The gas generating devices are evaluated in a 60 Liter (L) test tank with arrangements to record the pressure-time profile and arrangements to sample the gas for determining the toxic components of the gas generated.

The following examples further illustrate the gas generating compositions useful in the gas generating devices of the present invention which have utility in the airbag industry. They are illustrative of the invention, but are not limiting. Examples 1 through 7 have the gas generating compound ignited in a gas generating device having only a single chamber which contained metal chips to cool the generated gas, rather than two chambers, as in the preferred embodiments of the gas generating device of the present invention.

EXAMPLE 1

A solid composition for generating gases comprising, by weight, 38.1% 5-AT, 42.7% $KNO_3$ and 18.2% $MnO_2$. The amount of gas generating compound in the device was 45 gms. The theoretical number of moles of gas produced is 2.26 moles for 100 gms of the composition. In this experiment the amount of CO was 5,102 ppm, the amount of $NH_3$ was 7.5%, and the amount of $CO_2$ was 3.75%.

EXAMPLE 2

A solid composition for generating gases comprising, by weight, 34.1% 5-AT, 42.7% $KNO_3$ and 22.2% $MnO_2$. The amount of gas generating compound in the device was 40 gms. The theoretical number of moles of gas produced was 2.1 moles for 100 gms of the composition. In this experiment the amount of CO was not determined, the amount of $NH_3$ was 12.5%, and the amount of $CO_2$ was 6.25%.

EXAMPLE 3

A solid composition for generating gases comprising, by weight, 40% 5-AT, 38% $KNO_3$ and 22% CuO. The amount of gas generating compound in the device was 40 gms. The theoretical number of moles of gas produced was 2.35 moles for 100 gms of the composition. In this experiment the amount of CO was 195 ppm, the amount of $NH_3$ was 3.0%, and the amount of $CO_2$ was <0.1%.

EXAMPLE 4

A solid composition for generating gases comprising, by weight, 40% 5-AT, 30% of $KNO_3$ and 30% CuO. The amount of gas generating compound in the device was 40 gms. The theoretical number of moles of gas produced was 2.35 moles for 100 gms of the composition. In this experiment the amount of CO was 628 ppm, the amount of $NH_3$ was 1.25%, and the amount of $CO_2$ was 1.25%.

EXAMPLE 5

A solid composition for generating gases comprising, by weight, 38% 5-AT, 22% $KNO_3$, 12% $KClO_4$, 18% $MnO_2$ and 10% CuO. The amount of gas generating compound in the device was 43 gms. The theoretical number of moles of gas produced was 2.25 moles for 100 gms of the composition. In this experiment the amount of CO was 17,476 ppm, the amount of $NH_3$ was >1,250 ppm, and the amount of $CO_2$ was 1.25%.

EXAMPLE 6

A solid composition for generating gases comprising, by weight, 38% 5-AT, 24% $KNO_3$, 16% $KClO_4$, and 12% CuO. The amount of gas generating compound in the device was 43 gms. The theoretical number of moles of gas produced was 2.28 moles for 100 gms of the composition. In this experiment the amount of CO was 22,819 ppm, the amount of $NH_3$ was 829 ppm, and the amount of $CO_2$ was 2.0%.

EXAMPLE 7

A solid composition for generating gases comprising, by weight, 38% 5-AT, 26% $KNO_3$, 12% $KClO_4$, 12% $MnO_2$, and 12% CuO. The amount of gas generating compound in the device was 43 gms. The theoretical number of moles of gas produced was 2.31 moles for 100 gms of the composition. In this experiment the amount of CO was 5,263 ppm, the amount of $NH_3$ was 14 ppm, and the amount of $CO_2$ was 3.57%.

In examples 8–11 the gas generating composition was ignited in a dual chamber housing, as in the preferred gas generating devices of the present invention.

EXAMPLE 8

The same gas generating composition used in example 7 was retested in a dual chamber gas generating device. The amount of gas generating composition in the device was 23 gms. The theoretical number of moles of gas produced was 2.31 moles for 100 gms of the composition. In this experiment the amount of CO was 63 ppm, the amount of $NH_3$ was <0.5 ppm, and the amount of $CO_2$ was 2.9%. This example clearly illustrates that when the disclosed gas generating compositions are ignited in a properly designed gas generating device the amount of CO in the generated gas can be controlled to be less than 200 ppm, and preferably less than 100 ppm. Furthermore, a smaller amount of the gas generating composition is required in order to yield the required volume of gas.

EXAMPLE 9

A solid composition for generating gases was made comprising, by weight, 38% 5-AT, 30% $KNO_3$, and 32% $Fe_2O_3$. The amount of gas generating compound in the device was 23 gms. The theoretical number of moles of gas produced was 2.28 moles for 100 gms of the composition. In this experiment the amount of CO was 3,868 ppm, the amount of $NH_3$ was 1,000 ppm, and the amount of $CO_2$ was 1.2%.

EXAMPLE 10

A solid composition for generating gases comprising, by weight, 38% 5-AT, 26% $KNO_3$, 12% $KClO_4$, 12% $Fe_2O_3$ and 12% $MnO_2$. The amount of gas generating compound in the device was 23 gms. The theoretical number of moles of gas produced was 2.5 moles for 100 gms of the composition. In this experiment the amount of CO was 167 ppm, the amount of $NH_3$ was 0.6%, and the amount of $CO_2$ was 3.3%.

EXAMPLE 11

A solid composition for generating gases comprising, by weight, 38% 5-AT, 26% $KNO_3$, 12% $Fe_2O_3$, 12% $KClO_4$, and 12% CuO. The amount of gas generating compound in the device was 23 gms. The theoretical number of moles of gas produced was 2.77 moles for 100 gms of the composition. In this experiment the amount of CO was 100 ppm, the amount of $NH_3$ was 1.1%, and the amount of $CO_2$ was 3.3%.

The foregoing examples indicate the wide range of gas generating compositions which may be employed in the gas generating devices of the present invention. The composition of Example 7 comprising, by weight, about 38% 5-AT, about 26% $KNO_3$, about 12% $KClO_4$, about 12% $MnO_2$, and about 12% CuO is the most preferred gas generating composition for use in the present gas generating device.

When a gas generating composition comprising in combination 5-aminotetrazole and at least two oxidizers selected from the group consisting of potassium nitrate, potassium per-chlorate, ferric oxide, copper oxide and manganese dioxide was ignited in a conventional inflator housing the gas which was generated did not meet the standards of the airbag industry for inflation gases. It was observed while a primary gas generating reaction occurred inside the inflator housing, a secondary reaction involving the generated gases was occurring within the tank which contained the gases. Surprisingly, by using a housing which allows the complete gas generating reaction to take place in the confinement of the housing the gases generated do meet the standards of the airbag industry for inflation gases.

Referring next to FIGS. 2, 3, 4, 5 and 6 there is shown a gas generating device 20 in accordance with a first embodiment wherein a crash sensor (not shown) closes an electrical circuit or initiates a firing signal which activates a squib 24 which ignites a booster composition 26, which in turn ignites a gas generating composition 28 located in a housing. As used herein and in the claims a squib is understood to be an electrical device having two electrodes insulated from one another and connected by a bridge wire. The bridge wire is preferably embedded in one or more layers of pyrotechnic compositions designed to give a flash (heat) of sufficient intensity to ignite the booster composition.

A gas generating device 20 according to a preferred embodiment of the invention comprises a first housing member 21, a second housing member 22, and a choke plate 23 which is interposed between the first and second housing members. The first housing member 21 has a flange 30 which is bent over to secure the choke plate and the second housing member to the first housing member. The housing members and choke plate may be formed of any suitable material, preferably aluminum or steel.

In this first embodiment the first housing member 21 is cup shaped with a recess 36 extending inwardly from the closed end thereof. As used herein and in the claims, terms such as "inward", "inwardly" and so forth are understood to refer to directions going towards the interior of the gas generating device, and terms such as "outward" and "outwardly" are understood to refer to directions going towards the exterior of the gas generating device. The recess 36 in the closed end of the first housing member 21 has an aperture 35 therethrough to accommodate the assembly of a squib 24 with the first housing member. The squib is secured in place by a collar 25 which is telescoped over the inside surface of the closed end of the first housing member. A cup 27 containing a booster composition 26 is telescoped over the outside surface of the collar 25. A gas generating composition 28 is located in the first housing member. Preferably, in each of the embodiments disclosed herein an auto-ignition substance 33 is disposed within the housing in close proximity to the gas generating composition 28. The auto-ignition substance is a composition which will spontaneously ignite at a preselected temperature, and thereby ignite the gas generating composition. The gas generating compositions which are used in the practice of the present invention may react in a much more violent manner if the ambient temperature is elevated, for example above 180 degrees Fahrenheit, and so it is desirable to set off the reaction before such a violent reaction can occur.

A choke plate 23 having a plurality of apertures 29 therethrough is located at the open end of the first housing member. The significance of the number and size of the apertures through the choke plate is elaborated upon in detail below. A second housing member 22 is located at the open end of the first housing member 21 with the choke plate 23 located between the first and second housing members. The second housing member has a plurality of apertures 32 therethrough. The significance of the number and size of the apertures through the second housing member is elaborated upon in detail below. The second housing member is cup shaped. A flange 31 is located at the open end of the second housing member. In this preferred embodiment the choke plate 23 and the flange 31 of the second housing member are secured to the first housing member by a flange 30 of the first housing member which is bent over inwardly. Preferably the first and second housing members and the choke plate are further secured to one another by a single laser weld extending therethrough along the periphery of a side or edge of the folded over flange 30 of the first housing member. However, it is understood that the components of a gas generating device in accordance with the present invention, with the exception of the gas generating and booster compositions, may be secured to one another in any suitable manner including, but not limited to, clamping, welding, riveting, adhesives, threaded fasteners, and the like.

The booster composition 26 is preferably $BKNO_3$, but any suitable booster composition may be used. The operation of a gas generating device in accordance with the present invention can be better understood by referring next to FIG. 3. The squib 24 is activated by an electrical impulse. In the case of an airbag system for a vehicle this electrical is initiated by a crash sensor which has detected a crash of such severity that the airbag should be deployed. The squib 24 ignites the booster composition 26, which produces enough pressure to ruptures the cup 27 containing the booster composition as shown at 27a. The gas generating composition 28 is ignited by the heat generated by the booster composition, and the resulting chemical reaction generates gas which passes through the apertures 29 in the choke plate into the second housing member, and thereafter exits the gas generating device via the apertures 32 in the second housing member.

The rate at which the gases generated by the gas generating composition exit the gas generating device may be influenced by the size and number of apertures 29 in the choke plate and the size and number of apertures 32 in the second housing member. It has been discovered that dependent upon the amount of gas generating composition used, which in turn is dependent upon the volume of gas required for any given situation, the size and number of these apertures may be varied to cause the all, or at least most, of the gas generating reaction to occur within the confines of the gas generating device. A good measure of the efficiency of a gas generating device of the present invention is the amount of carbon monoxide in the generated gas.

A gas generating device in accordance with the present invention is a housing in combination with a means for igniting a gas generating composition located within the housing, the gas generating composition being 5-aminotetrazole combined with at least two inorganic oxidizers selected from the group consisting of potassium nitrate, potassium per-chlorate, manganese dioxide, iron oxide, and copper oxide. The housing has at least one aperture therethrough to allow the exit therefrom of gas generated therein following ignition of the gas generating composition, but restricting the flow of gas from the housing such that the gas exiting the housing has a carbon monoxide content of not greater than 200 ppm, and preferably not greater than 100 ppm when the generated gas is collected in a 60 liter tank.

One way of restricting the flow of generated gas from the housing is the number and size of apertures 29 in the restrictor plate 23, and another is the number and size of apertures 32 in the second housing member 22.

A gas generating device in accordance with the preferred embodiments of the present invention is a housing in combination with a means for igniting a gas generating composition located within the housing. The housing contains a plurality of chambers, one of which contains the gas generating composition, with the chambers separated from one another by a barrier which will slow the entry of the gas into the second chamber. As disclosed herein, this barrier between the chambers may be in the form of a choke plate having apertures therein, a membrane, a perforated foil, or any other suitable barrier. The gas generating composition being 5-aminotetrazole combined with at least two inorganic oxidizers selected from the group consisting of potassium nitrate, potassium per-chlorate, manganese dioxide, iron oxide, and copper oxide. The housing has at least one aperture therethrough to allow the exit therefrom of gas generated therein following ignition of the gas generating composition, but restricting the flow of gas from the housing such that the gas exiting the housing has a carbon monoxide content of not greater than 200 ppm, and preferably not greater than 100 ppm when the generated gas is collected in a 60 liter tank.

PROOF OF PRINCIPLE

Number 1

23 gms of the gas generating composition disclosed in Example 7 were placed into a housing similar to the type shown in FIGS. 2–6 along with 1 gm of BKNO$_3$ as a booster composition. The first housing member 21 had a inside diameter of about 45 mm and an inside height of about 21 mm. The second housing member had an inside diameter of about 43 mm and an inside height of about 12 mm. In order to be reusable for testing purposes the first and second housing members were threadably attached to one another rather than assembled as shown in FIGS. 2–6. The choke plate 23 had sixty apertures 29 therein, with the aperture diameter being 3 mm. The second housing member had seventy five apertures 32 therein, with the aperture diameter being 3 mm. Two layers of an expanded metal material comprising approximatly 0.050" thick 304 stainless steel with 1/8" diamond shape openings therethrough was located inside the second housing member over the apertures 32. This trial was carried out at ambient temperature with no special temperature or humidity conditioning of the gas generating device. The booster composition was ignited with a squib and the gas generated by the gas generating device was collected in a 60 liter tank. The test was conducted twice on the same day. The main gas generated was nitrogen. The airborne particulate in the gas generated in Test 1 was 76 ppm and in Test 2 was 20 ppm. Other substances present in the generated gas are presented in TABLE 1 in parts per million.

TABLE 1

| test | CO | C$_6$H$_6$ | NCOH | NO | NO$_2$ | NH$_3$ |
|------|-----|------|------|-----|--------|--------|
| 1 | <50 | 2 | 55 | 75 | 250 | <0.5 |
| 2 | 89 | 2 | 30 | 100 | 250 | <0.5 |

PROOF OF PRINCIPLE

Number 2

23 gms of the gas generating composition disclosed in Example 7 were placed into a housing similar the type shown in FIGS. 2–6 along with 0.7 gm of BKNO$_3$ as a booster composition. The first housing member 21 had a inside diameter of about 45 mm and an inside height of about 21 mm. The second housing member had an inside diameter of about 43 mm and an inside height of about 12 mm. In order to be reusable for testing purposes the first and second housing members were threadably attached to one another rather than assembled as shown in FIGS. 2–6. The choke plate 23 had sixty apertures 29 therein, with the aperture diameter being 3 mm. The second housing member had seventy five apertures 32 therein, with the aperture diameter being 3 mm. Two layers of an expanded metal material comprising approximatly 0.050" thick 304 stainless steel with 1/8" diamond shape openings therethrough was located inside the second housing member over the apertures 32. This trial was carried out at ambient temperature with no special temperature or humidity conditioning of the gas generating device. The booster composition was ignited with a squib and the gas generated by the gas generating device was colleted in a 60 liter tank. This trial was carried out at ambient temperature with no special temperature or humidity conditioning of the gas generating device. The test was conducted twice on the same day. The main gas generated was nitrogen. The airborne particulate in the gas generated in Test 3 was 39 ppm and in Test 4 was 167 ppm. Other substances present in the generated gas are presented in TABLE 2 in parts per million.

TABLE 2

| test | CO | C$_6$H$_6$ | NCOH | NO | NO$_2$ | NH$_3$ |
|------|-----|------|------|-----|--------|--------|
| 3 | 63 | 2 | 35 | 100 | 125 | — |
| 4 | 156 | 2 | 15 | 125 | 275 | <.25 |

Figure 7:
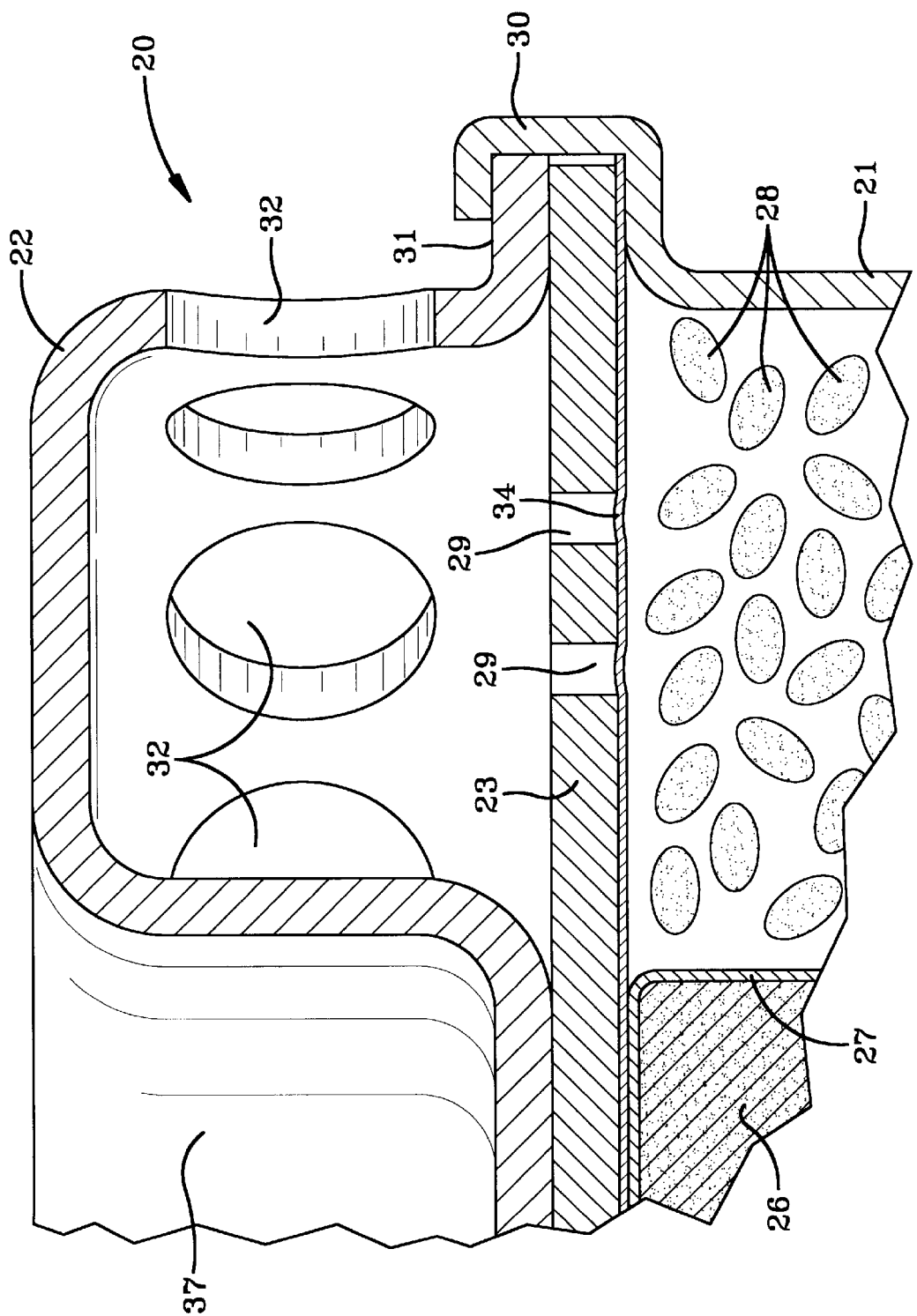
FIG. 7 is an enlarged fragmentary view, partially in section, of a second embodiment of a gas generating device according to the present invention.

Referring next to FIG. 7 there is shown an enlarged fragmentary view, partially in section, of a second embodiment of a gas generating device which is similar to that shown in FIGS. 2 through 6, but which has a membrane 34 disposed on the side of the choke plate 23 which is proximal to the gas generating composition 28. A gas generating device in accordance with the invention may be made using aluminum foil of a suitable thickness as the membrane, but a membrane of any suitable material and thickness may be used. The membrane 34 has a sufficient strength to resist the pressure of the expanding gas for only a very brief time before rupturing and allowing the gas to pass through the apertures 29 in the choke plate 23, thereby restricting the flow of gas from the housing and allowing the gas generating reaction to occur substantially completely within the housing.

Figure 8:
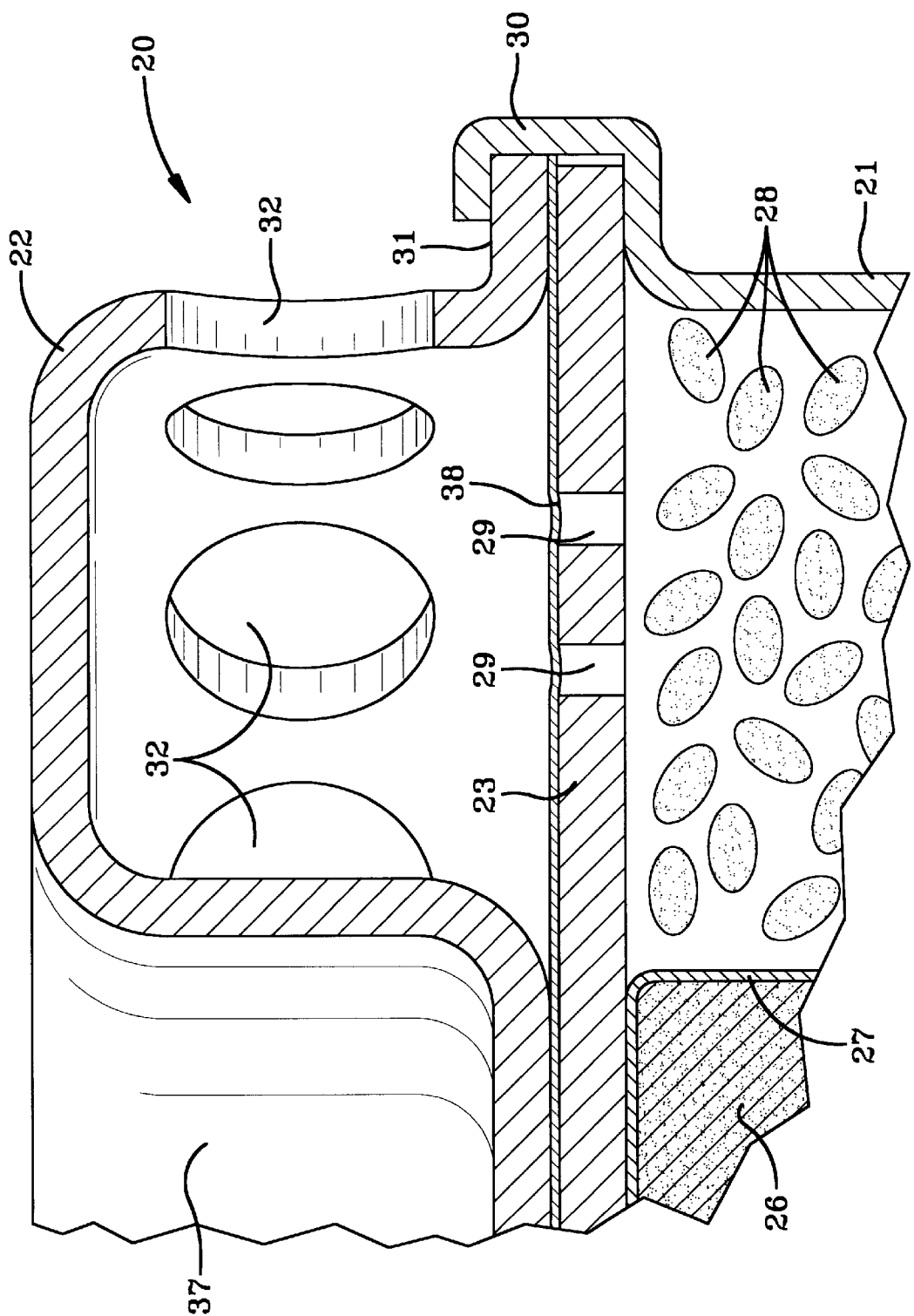
FIG. 8 is an enlarged fragmentary view, partially in section, of a third embodiment of a gas generating device according to the present invention.

Referring next to FIG. 8 there is shown an enlarged fragmentary view, partially in section, of a third embodiment of a gas generating device which is similar to that shown in FIG. 7 except that the membrane 38 is disposed on the side of the choke plate 23 which is distal to the gas generating composition 28. The membrane functions in substantially the same manner and should have substantially the same structure as described above with respect to the embodiment of FIG. 7.

Figure 9:
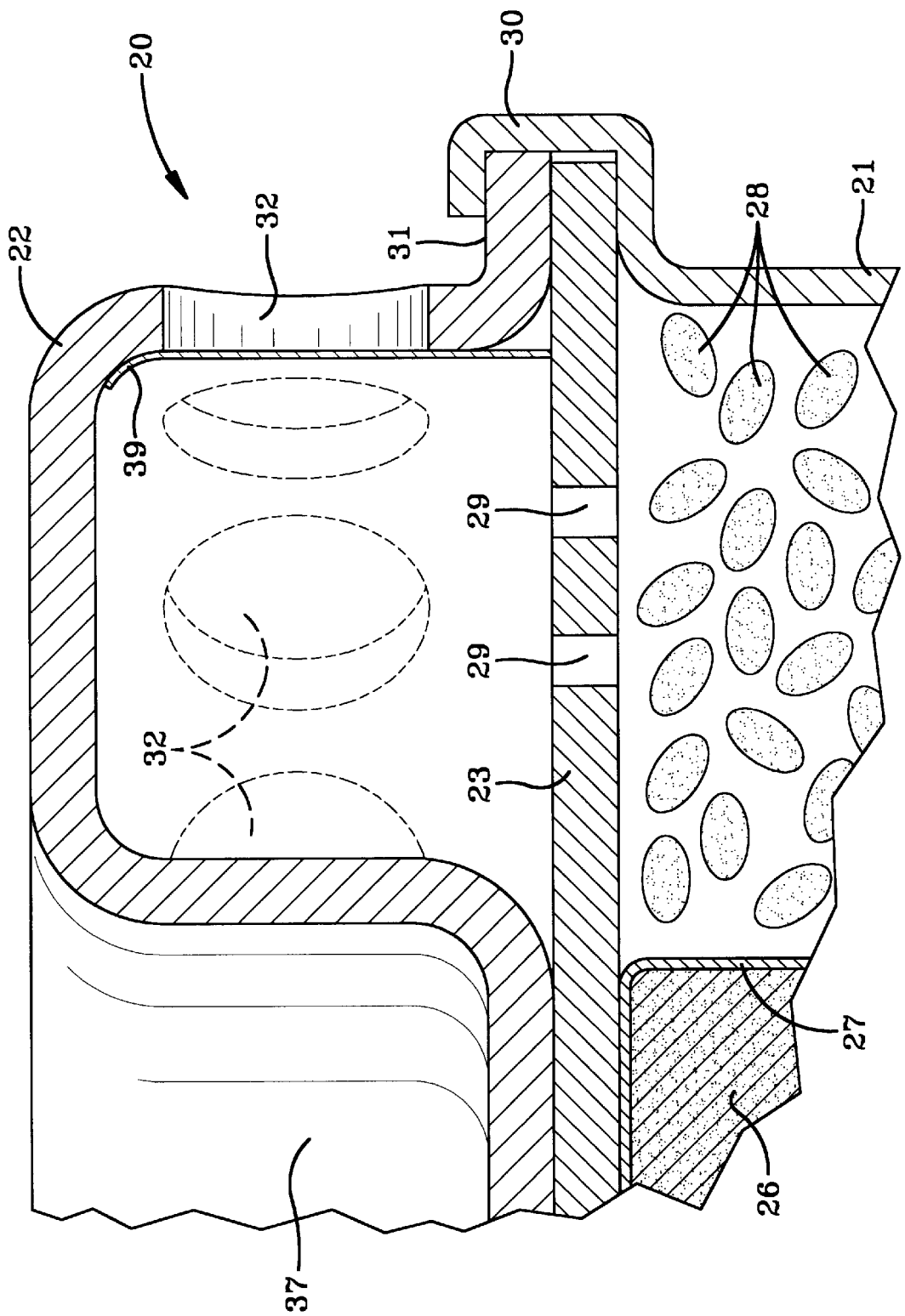
FIG. 9 is an enlarged fragmentary view, partially in section, of a fourth embodiment of a gas generating device according to the present invention.

Referring next to FIG. 9 there is shown an enlarged fragmentary view, partially in section, of a fourth embodiment of a gas generating device which is similar to those shown in FIGS. 7 and 8 except that the membrane 39 covers the apertures 32 in the second housing member 22. For example in the "Proof of Principle" described below two layers of an expanded metal material comprising approximatly 0.050" thick 304 stainless steel with 1/8" diamond shape openings therethrough was located inside the second housing member over the apertures 32. The membrane functions in substantially the same manner and should have substantially the same structure as described above with respect to the embodiment of FIG. 7 except that when ruptured by the pressure of the expanding gas it allows the gas to exit the housing through the apertures 32.

Figure 10:
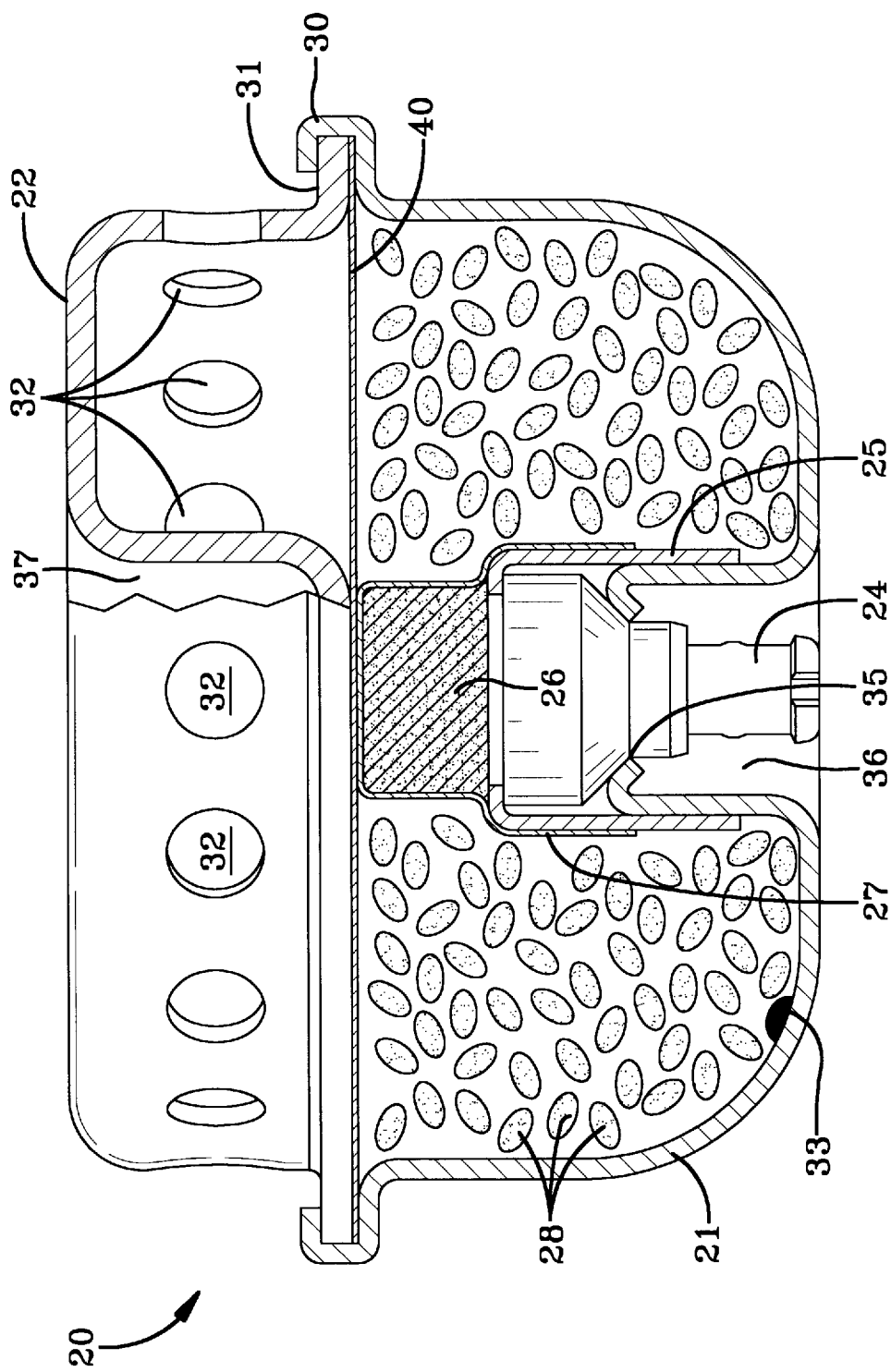
FIG. 10 is a side view, partially in section, of a gas generating device according to a fifth embodiment of the present invention.

Referring next to FIG. 10 there is shown a side view, partially in section, of a gas generating device according to a fifth embodiment wherein the choke plate has been eliminated, but a membrane 40 is located between the first 21 and second 22 housing members. The strength of the membrane should be such that it retards the expansion of the generated gas but will rupture to allow the gas to exit the housing through the apertures 32.

It is understood that the membranes in any of the embodiments shown in FIGS. 7 through 10 could be replaced by a woven metallic mesh, perforated metal foil, a mat of metallic or nonmetallic fibers, or any other suitable material which does not cool the gas too much or otherwise effect the gas generating reaction other than to restrict the rate at which the gas exits the housing so that substantially the entire gas generating reaction occurs within the housing.

Figure 11:
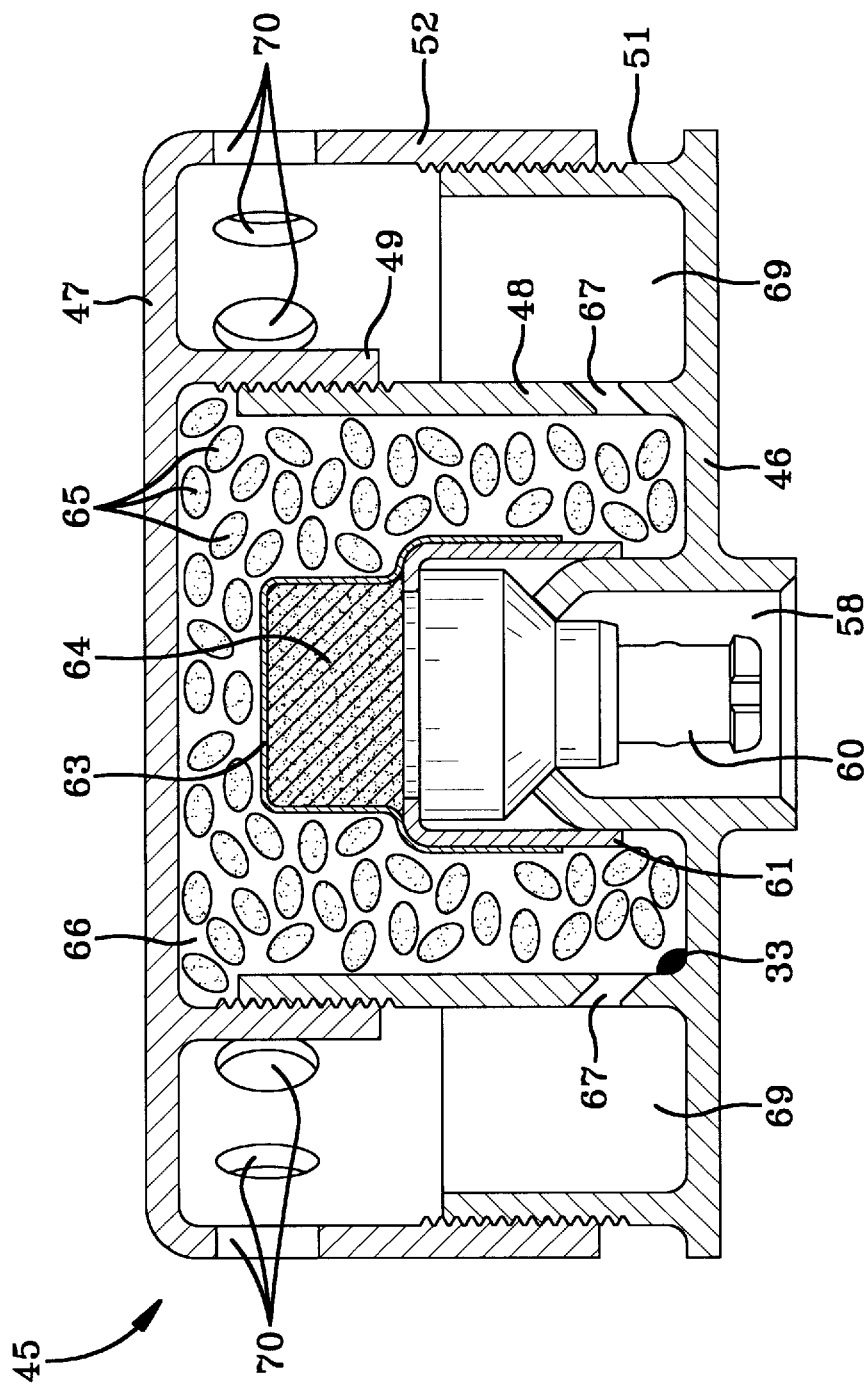
FIG. 11 is a side view, partially in section, of a gas generating device according to a sixth embodiment of the present invention.
Figure 12:
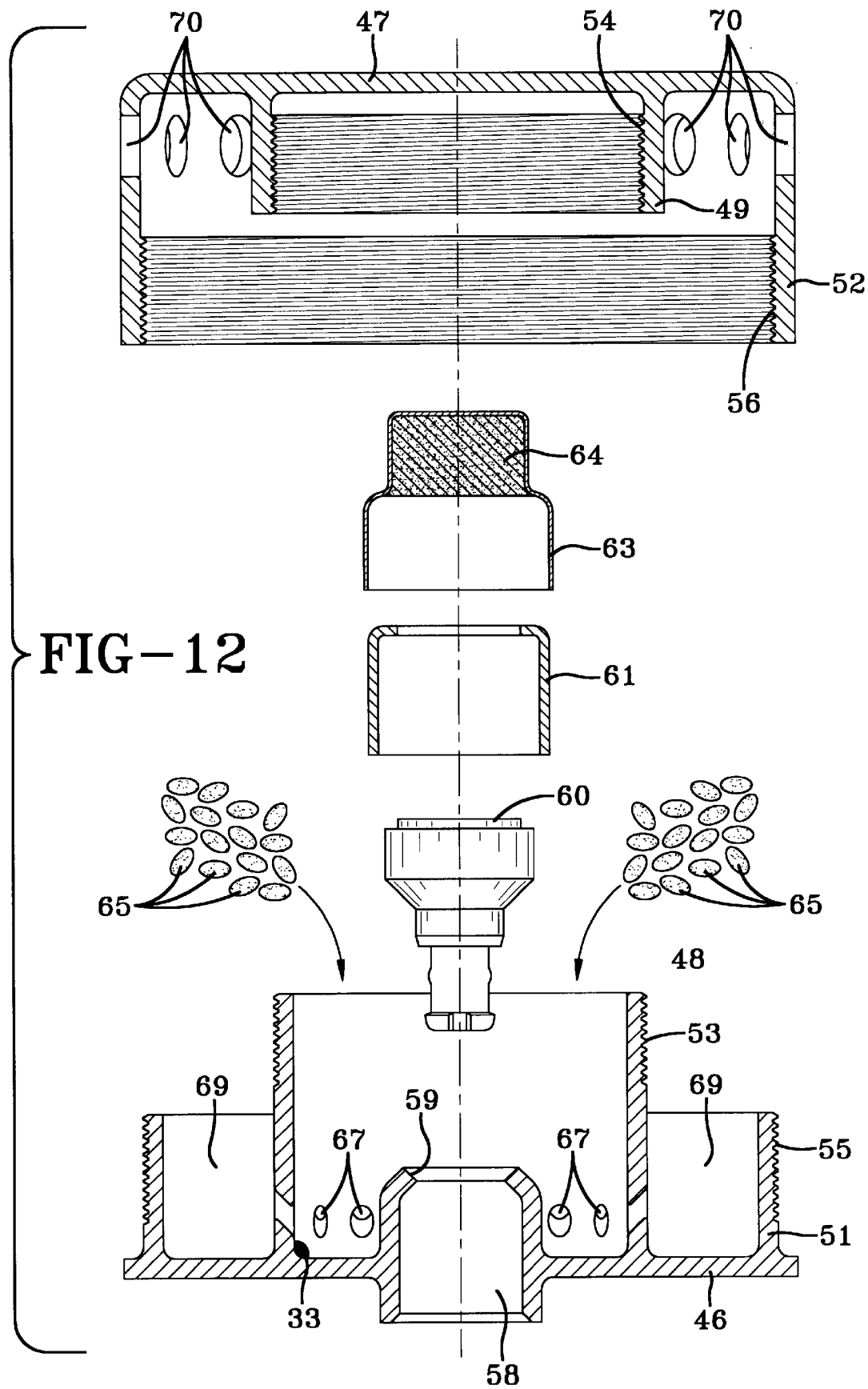
FIG. 12 is an exploded view, partially in section, of the gas generating device of FIG. 11.

Referring next to FIG. 11 there is shown a side view, partially in section, of a gas generating device 45 according to a sixth embodiment of the present invention, and FIG. 12 is an exploded view, partially in section, of the gas generating device of FIG. 11. In this embodiment the first housing member 46 and the second housing member 47 are secured together by threads. Both housing members have circular configurations. The inner wall of 48 of the first housing member has external threads 53 which are secured to internal threads 54 of the inner wall 49 of the second housing member. The outer wall of 51 of the first housing member has external threads 55 which are secured to internal threads 56 of the outer wall 52 of the second housing member. Preferably the threads employed are buttress type threads which are synchronized to allow the inner and outer walls of the two housing members to be screwed together at the same time regardless of whether the attachment process for the two walls begins simultaneously.

The first housing member 46 has a recess 58 therein with an aperture 59 therethrough to receive a squib 60, which is secured in place by a collar 61 which is telescoped over the inside surface of the closed end of the first housing member. A cup 63 containing a booster composition 64 is telescoped over the outside surface of the collar 61. The gas generating composition 65 is located in the chamber 61 which is defined by the first and second housing members.

Apertures 67 through the inner wall of 48 of the first housing member allow the generated gas to enter a chamber 69 and apertures 70 through the outer wall 52 of the second housing member allow the generated gas to escape from the housing. The rate at which the generated gas exits the housing can be controlled by the number and size of the apertures 67,70 and by using membranes to inhibit the passage of gas through the apertures as described above. In this embodiment the gas generating composition 65 is located in a first chamber 63 and a second chamber 69 extends circumferentially around the first chamber. The first and second chambers communicate via apertures in the wall separating the two chambers, and an external wall of the second chamber has at least one aperture 70 therethrough to allow gas to exit the housing. The joining of housing members to one another in the threaded manner shown in FIGS. 11 and 12 has been disclosed in U.S. Pat. No. 5,201,542.

Figure 13:
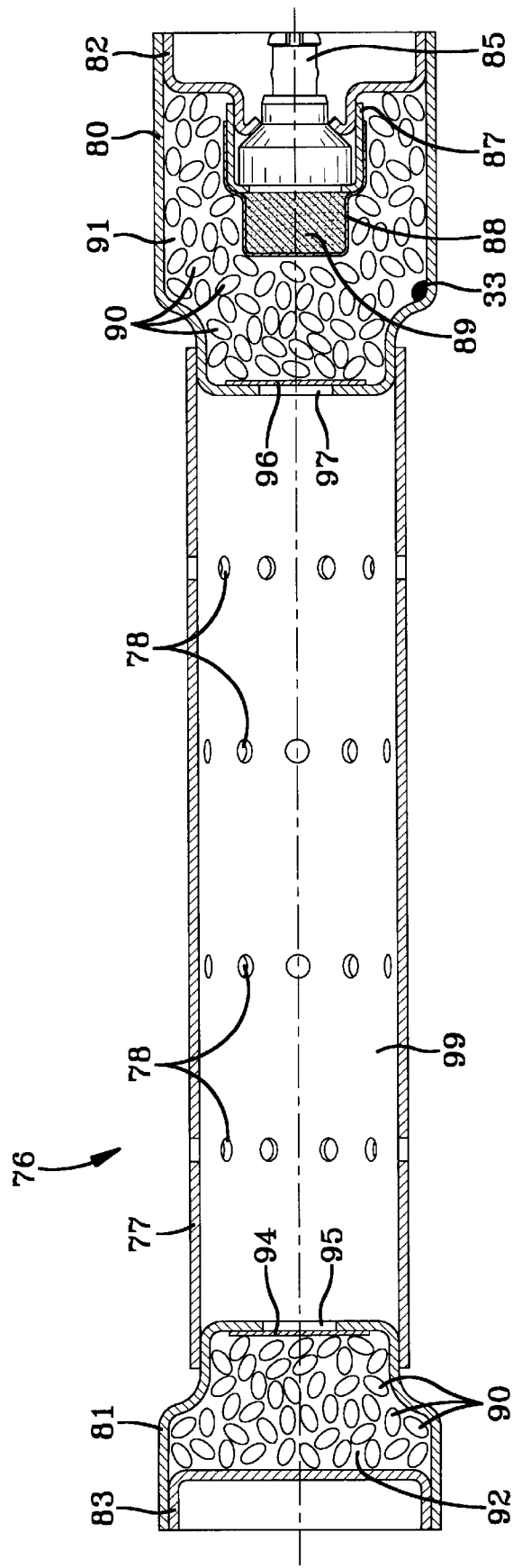
FIG. 13 is a side view, partially in section, of a gas generating device according to a seventh embodiment of the present invention.
Figure 14:
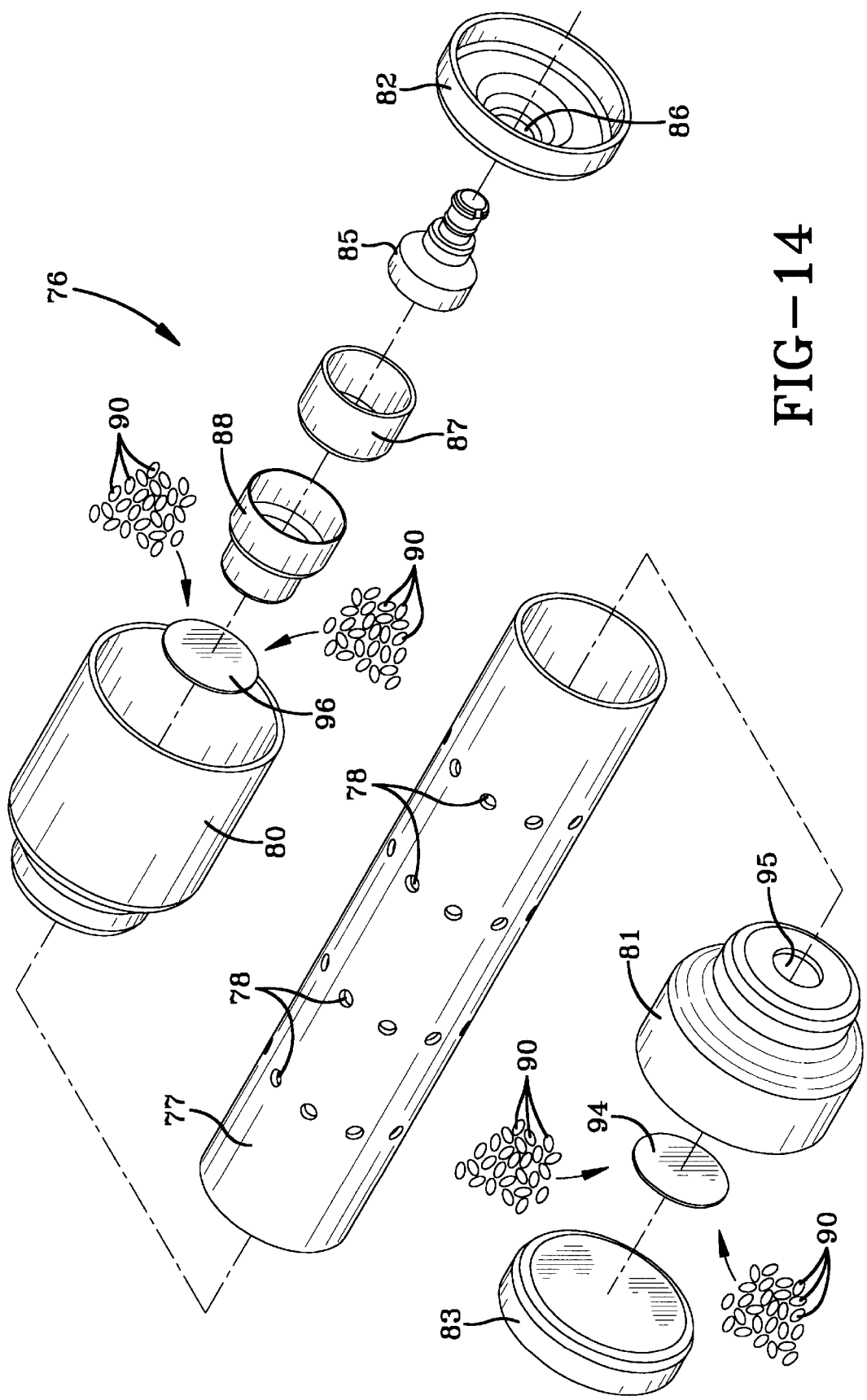
FIG. 14 is an exploded view, partially in section, of the gas generating device of FIG. 13.

Referring next to FIG. 13 there is shown a side view, partially in section, of a gas generating device 76 according to a seventh embodiment, and FIG. 14 is an exploded view, partially in section, of the gas generating device of FIG. 13. A tubular member 77 has apertures 78 therein. A first end housing member 80 and a second end housing member 81 are attached to the ends of the tubular member 77, for example by welding. A first end cap 82 is attached to the first end housing member and a second end cap 83 is attached to the second end housing member, thereby forming chambers 91,92 in the end housing members, along with a chamber 99 inside of the tubular member.

The first end cap 82 has an aperture 86 therein for receiving a squib 85. A collar 87 secures the squib in place with the first end cap. A cup 88 holds the booster composition 89 and telescopes over the collar 87. Membranes 96,94 of the types disclosed above cover openings 95,97 in the first and second end housing members, respectively. The gas generating composition 90 is located in the chambers 91,92 in the two end housing members.

When the squib 85 ignites the booster composition 89, which in turn ignites the gas generating composition 90 in the first end housing member 80, the expanding gas ruptures the membrane 96 and enters the tubular member through aperture 97. The hot gas then ruptures the membrane 94 associated with the second end housing member and ignites the gas generating composition 90 located in the second end housing member. By varying the amount of gas generating composition in the end housing members a pulsed release of gas into an airbag may be designed.

Figure 15:
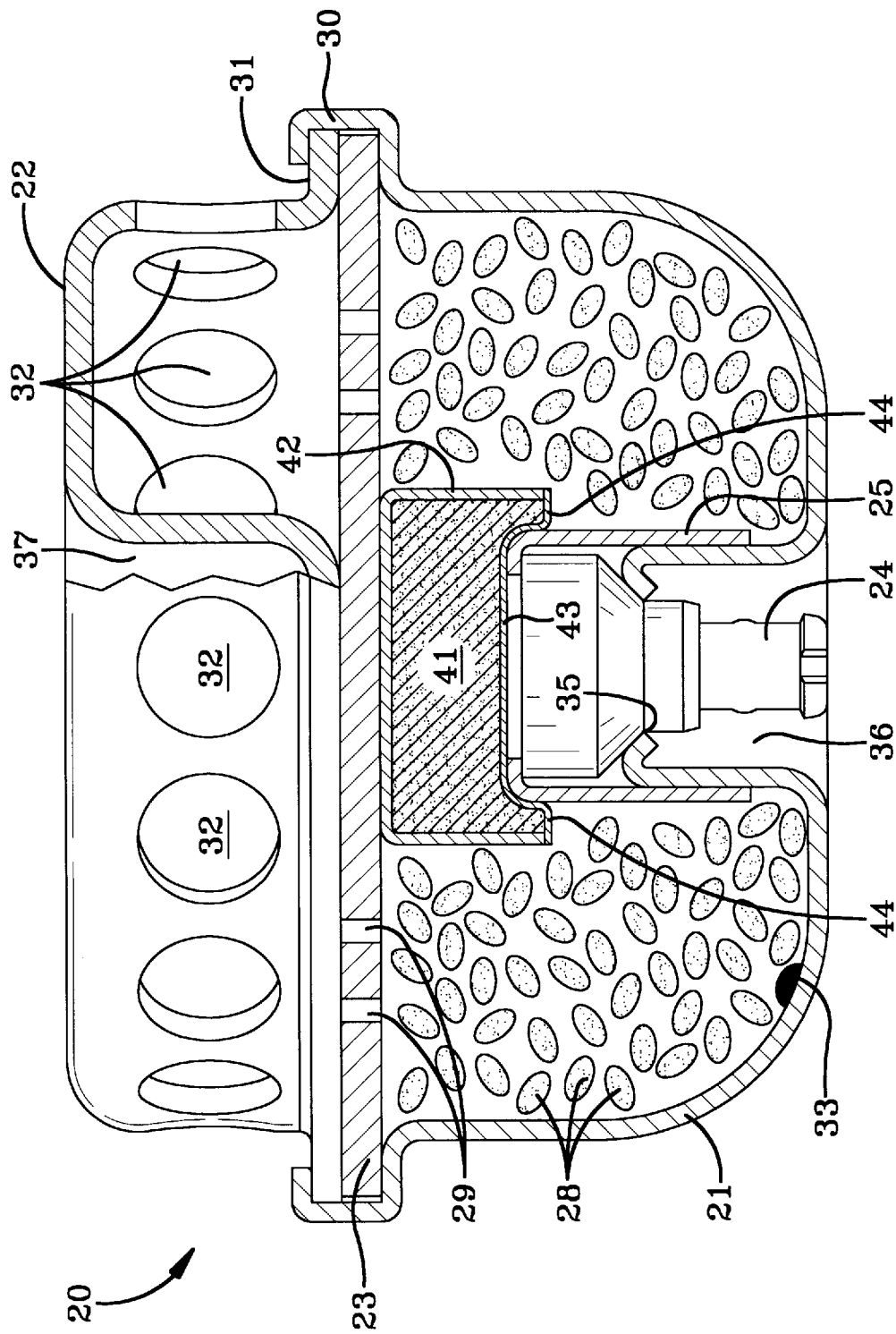
FIG. 15 is a side view, partially in section, of a gas generating device according to an eighth embodiment of the present invention.

Referring next to FIG. 15 there is shown a side view, partially in section, of a gas generating device according to an eighth embodiment of the present invention. This embodiment is substantially like that shown in FIGS. 2–6 with the exception that the cup 42 which holds the booster composition 41 has a membrane 43 covering its open end. The cup 42 comprises a material, such as a heavy gauge aluminum, which does not rupture when the booster composition 41 is ignited. The cup 42, booster composition 41 and membrane 44 are sandwiched between the choke plate 23 and the squib retaining collar 25. The flash of the ignited booster composition ruptures the membrane 43 in the area 44 between the squib retaining collar 25 and the cup 42.

Figure 16:
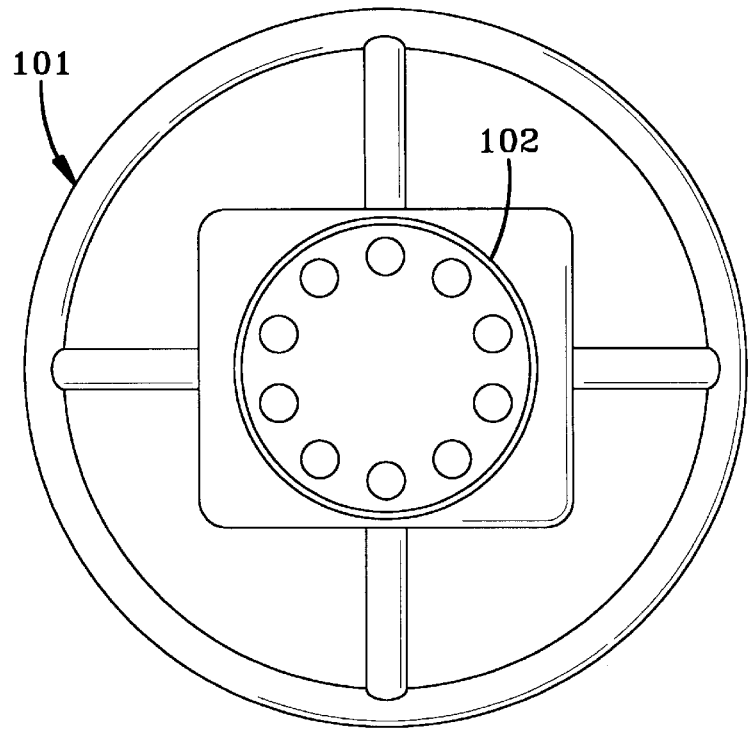
FIG. 16 is a diagrammatic representation of a prior art gas generating device housed in the hub of a steering wheel.
Figure 17:
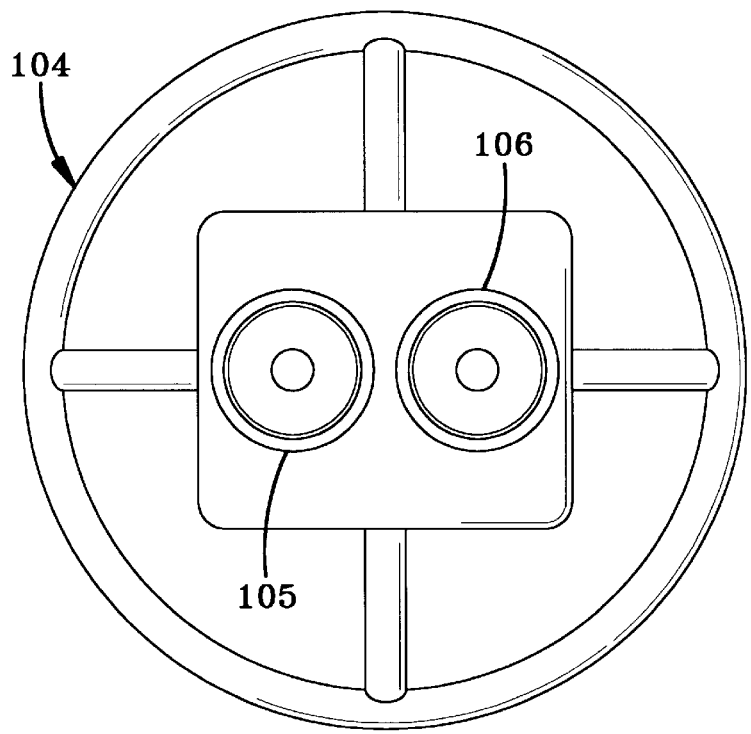
FIG. 17 is a diagrammatic representation of two gas generating devices of the present invention housed in the hub of a steering wheel.

One of the advantages of the gas generating device of the present invention is that it may be made much more compact than prior art gas generating devices because less gas generating composition is required to produce an equal volume of gas than when prior art gas generating compositions are used. FIG. 16 is a diagrammatic representation of a single prior art gas generating device housed in the hub, or shaft, of a steering wheel. It is clear that there is not room for two of these prior art gas generating devices in a confined space like the hub of a steering wheel. FIG. 17 is a diagrammatic representation of two gas generating devices of the present invention housed in the hub, or shaft, of a steering wheel. Such an arrangement of a plurality of the new gas generating devices in a hub, or shaft, of a steering wheel will facilitate the design of a pulsed inflation of an airbag, or allow various amounts of gas to be used for inflating the airbag. For example, the gas generating devices may be activated one after the other, or only one may be activated. Of course, the amount of gas generating composition in the two gas generating devices need not be the same. When coupled with a sophisticated controlling device may options are made possible through the use of the gas generating devices disclosed herein.

While certain representative embodiments and details have been presented for the purpose of illustrating the invention, it will be apparent to those skilled in the art that various changes and modifications may be made therein without departing from the spirit and scope of the invention.

I claim:

1. A gas generating system comprising two or more gas generating devices located within the steering wheel mechanism of a motor vehicle, each gas generating device comprising a housing in combination with a means for igniting a gas generating composition located within the housing, the housing having two chambers, a first chamber contains the gas generating composition, the first chamber is separated from the second chamber by a barrier which will slow the entry of the gas into the second chamber when the gas generating composition is ignited, the gas generating composition comprising, by weight, about 38% 5-aminotetrazole, about 26% potassium nitrate, about 12% potassium per-chlorate, about 12% manganese dioxide and about 12% copper dioxide; the housing having at least one aperture therethrough to allow the exit from the second chamber of gas generated in the housing by the gas generating composition, but restricting the flow of gas from the housing such that the gas exiting the housing has a carbon monoxide content of not greater than 200 parts per million when the generated gas is collected in a 60 liter tank.

2. The gas generating system of claim 1 wherein each gas generating device further comprises a booster composition which is ignited by the means for igniting and in turn ignites the gas generating composition.

3. The gas generating system of claim 1 wherein each gas generating device further comprises a booster composition which is ignited by the means for igniting and in turn ignites the gas generating composition.

4. The gas generating system of claim 3 wherein the booster composition comprises $BKNO_3$.

5. The gas generating system of claim 1 wherein said barrier between the two chambers is a membrane.

6. The gas generating system of claim 1 wherein said barrier between the two chambers is a metallic foil.

7. The gas generating system of claim 1 wherein said barrier between the two chambers is a choke plate having a plurality of apertures therethrough.

8. The gas generating system of claim 1 wherein the gas exiting the housing has a carbon monoxide content of not greater than 100 parts per million when the generated gas is collected in a 60 liter tank.

* * * * *